No. 804,613. PATENTED NOV. 14, 1905.
F. A. MAGOWAN.
VEHICLE TIRE.
APPLICATION FILED AUG. 12, 1905.
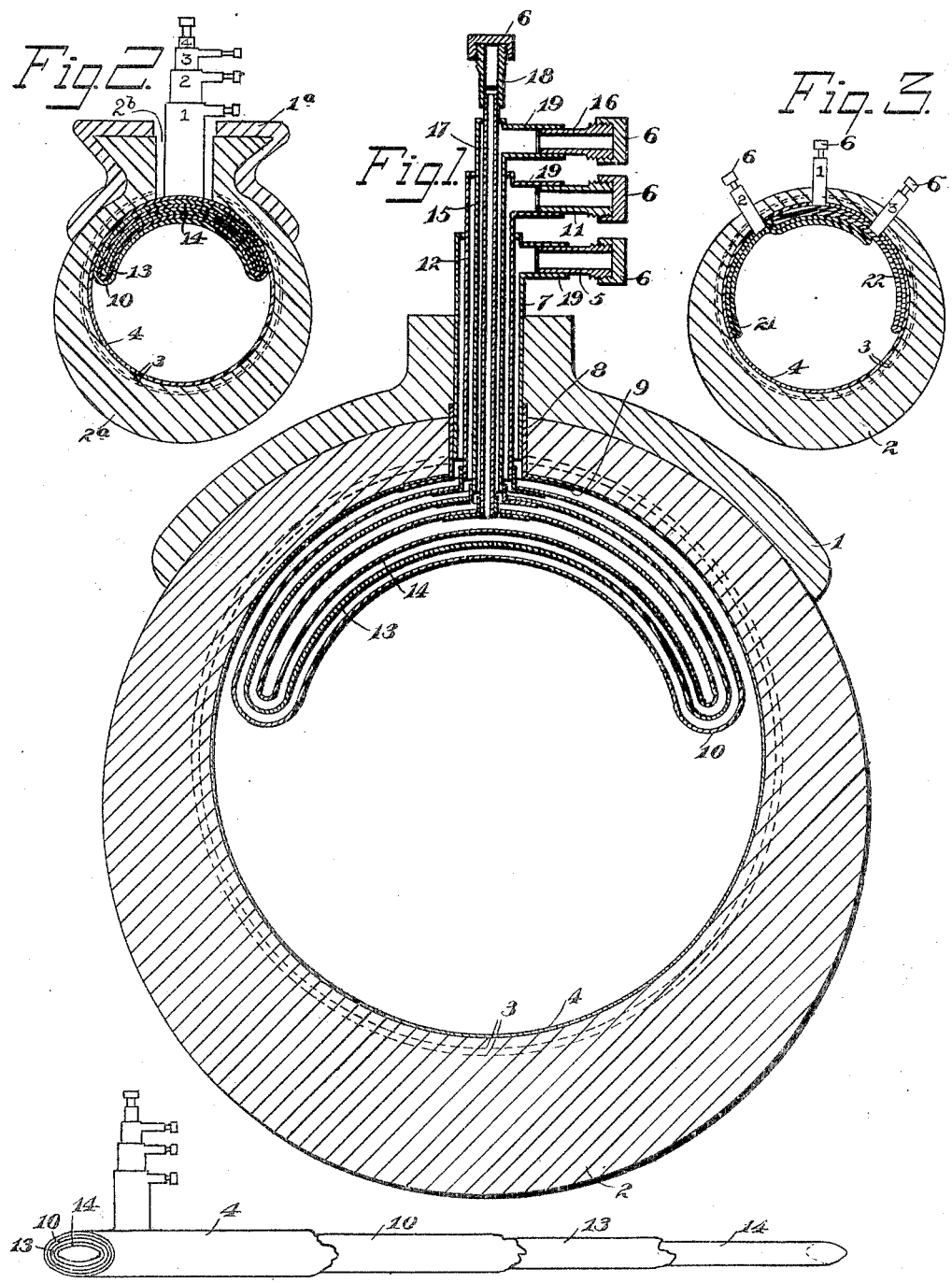
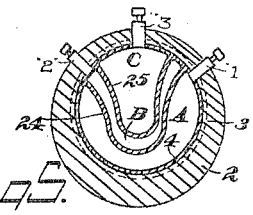
WITNESSES:
Kittie Frankfort
Wm. M. Hilbert
INVENTOR
Frank A. Magowan
BY
B. C. Stickney
ATTORNEY

UNITED STATES PATENT OFFICE.

FRANK A. MAGOWAN, OF TRENTON, NEW JERSEY.

VEHICLE-TIRE.

No. 804,613.        Specification of Letters Patent.        Patented Nov. 14, 1905.

Application filed August 12, 1905. Serial No. 273,969.

*To all whom it may concern:*

Be it known that I, FRANK A. MAGOWAN, a citizen of the United States, residing in Trenton, in the county of Mercer and State of New Jersey, have invented certain new and useful Improvements in Vehicle-Tires, of which the following is a specification.

This invention relates to pneumatic tires for the wheels of vehicles, particularly automobiles and other conveyances which are severely used and incur great liability of tire-puncturing and consequent delay, inconvenience, and expense. These tires are made in several styles—such as the so-called closed "single-tube" or "hose-pipe" tire and the "detachable" or "inner-tube" tire—that is, a tire provided with a detachable inner tube usually having overlapping ends. The latter kind of tire is often preferred on account of the relative ease with which a puncture may be repaired; but still it is difficult, owing to the size of an automobile-tire, to manipulate the same for this purpose, and there is danger in replacing the outer cover that the parts may not be securely fastened, thereby incurring great danger of accidental ripping off of the tire under the enormous lateral strain to which it is subjected in rapidly-moving heavy automobiles.

The object of my invention is to simplify, facilitate, and cheapen the means for obviating the injury arising from the puncture of the tire, so that by a simple and quick operation the tire may be restored to its normal inflated or working condition.

While my invention is adapted to many kinds of tires, including the open or so-called "detachable inner-tube" tire, it has especially important advantages in connection with the closed or so-called "hose-pipe" tire, since the facility with which the tire after puncturing may be restored to working condition is so great that the objection to the use of this style of tire is overcome, while all its advantages of great simplicity, strength, stability, and cheapness are retained. After the tire is punctured, and consequently deflated, it is only necessary in practicing my invention to open a valve, attach a pump, and reinflate the tire, whereupon the same is in as good or even better working condition than before the puncture, so that the interruption to travel of the automobile or vehicle is insignificant. Since no manipulation whatever of the body of the tire is required, it will readily be understood why the invention is of especially great value in the closed or so-called "single-tube" or "hose-pipe" tire.

In carrying out my invention in its preferred form I provide a tire with one or more reserve or spare inner tubes, preferably three, and these are preferably nested or contained one within another and occupy a position opposite to the tread of the tire—that is, close to the rim side thereof—where they are not likely to be reached by anything that punctures the shoe or tread of the tire. These spare inner tubes will usually be in a deflated condition and packed against the wall of the tire. The latter is provided with an inflation-valve, so that it may be inflated independently of said spare inner tubes. When the tire becomes deflated from a puncture, it is only necessary to inflate one of said spare inner tubes. When the latter are nested together, the outer thereof is the first to be inflated after a puncture, and when so inflated it completely fills the bore or original chamber of the tire, and being unpunctured the tire is thereby brought at once into running condition. The first spare inner tube when so inflated reinforces in some measure the inner wall of the tire, the latter being thus provided with a two-ply air-tube and not being quite so liable to leak or to suffer penetration from a sharp device as formerly. When, however, a puncture extends not only through the tread portion of the tire, but also through the wall of said first-inflated spare tube, so that the tire again becomes deflated, it is only necessary to attach the pump to a valve provided upon the next inner of the spare tubes, and thereby inflate the same and the tire, and so on throughout the series of spare inner tubes, of which I preferably provide three, so that the tire may continue in perfect working condition even though suffering from three successive punctures. Each of the inner tubes is provided with means whereby it may be inflated independently of the other inner tubes, as by providing a separate inflation-valve connected to each tube. It will thus be seen that not only may a long automobile journey be begun with assurance that the tire will last throughout the journey, and not only is it unnecessary to encumber the automobile with a spare tire, as usual, for long journeys, but it will also be understood that a sufficient number of spare inner tubes may be included in each tire to overcome all the punctures that it will be liable to sustain before its tread is worn out. Generally three or four spare inner tubes will be sufficient for this purpose.

The invention includes the provision of either a greater or smaller number of spare inner tubes than three.

In the accompanying drawings, Figure 1 is a cross section of the lower portion of a closed or hose-pipe tire attached to a rim and protovided with my improvements, the tire being shown inflated and the spare inner tubes as nested together and nearly deflated. Each of inner tubes seen at this figure is preferably endless. Fig. 2 is a view illustrating my improvements as applied to an open or detachable tube tire, from which the set of inner tubes may be readily detached, if desired. In this figure the spare inner tubes are shown as completely deflated and packed against the rim side of the tire, and it will be understood that each of the air-tubes seen at this figure may be provided with two closed ends in the same manner as the ordinary air-tube in a detachable tire. Fig. 3 is a view illustrating another method of disposing the spare inner tubes within the tire. The latter is illustrated as of the hose-pipe variety, although this form of the invention may be applied to the variety of tire seen at Fig. 2. Fig. 4 illustrates one stage in the process of manufacture of nested inner tubes for a tire. Fig. 5 illustrates another form of spare inner tubes, the tubes in this figure being more in the nature of compartments and being shown in uninflated condition, each compartment or tube having an independent inflation-valve.

Referring more particularly to the form seen at Fig. 1, the rim of the vehicle-wheel is seen at 1, and attached thereto is an inflated tire comprising a thickened shoe or tread portion 2, having the usual plies of fabric 3 and provided with a lining 4 of fine quality pure soft air-tight rubber, preferably vulcanized to the tread or main portion of the tire 2. This member 4, it will be understood, corresponds to the usual detachable inner tube employed in the open or detachable variety of tire and may in some cases be separate from the cover or hose-pipe 2—that is, not vulcanized thereto. The main tire is inflated by means of a valve 5, having a detachable cap 6 and also provided with the usual back-check interior valve. (Not shown.) The valve 5 communicates by a hollow stem 7 with the lined bore of the tire—that is, with the interior of endless tube 4—whereby the tire may be inflated, the lower end of the stem 7 being secured to the tire by any suitable means known in this art—as, for instance, by means of a soft-rubber thimble or nipple 8, having a flange 9 vulcanized to the interior of the lining 4. Within said bore or main chamber of the tire, or rather within the member 4, (which may be omitted in some cases,) is a spare inner tube 10, made, preferably, of highly-yielding air-tight pure soft rubber, said tube being preferably endless and originally occupying a position close to the rim side of the tire—that is, at the upper portion of the tire, as seen at Fig. 1, which is a cross-section of that portion of the wheel which rests upon the ground. It will be seen that said spare tube 10 is located far away from the tread portion of the tire, so that it is practically out of the reach of anything which might work through the tread of the tire. The spare tube 10 is illustrated as partly inflated, although when out of use said tube may be wholly deflated. It is inflatable, however, independently of the lining 4 or of the main tube 2, so that although the latter is punctured still such puncture does not prevent the immediate reinflation of the tire or the retention of the air after such inflation. The spare tube 10 is provided with an inflation-valve 11, having a cap 6 and communicating with a hollow stem 12, inserted within said stem 7 and appropriately attached to the inner tube 10. A suitable cement or healing mixture may in some instances be injected through the puncture and spread between the tube 10 and the lining 4, thereby making an additional repair to the puncture and giving better support to the tube 10 at that point. For a similar purpose as the tube 10 I provide additional expansible spare tubes 13 and 14 of substantially similar construction and both contained within the tube 10, the tube 14 being preferably contained within the tube 13, so that all the tubes, it will be seen, are nested together. The tube 13 is provided with a stem 15 within the stem 12 and having an inflation-valve 16. The innermost tube 14 has a hollow stem 17, to the top of which is attached an inflation-valve 18. The valves 5, 11, and 16 may be inserted within nipples 19, projecting from their respective hollow stems.

It will be understood that in using the invention in one way the valve 5 is originally employed to inflate the lined main chamber or bore of the main tire, the tubes 10, 13, and 14 remaining out of use or deflated. When the tire suffers a puncture and becomes deflated, it is only necessary to detach the cap 6 from the valve 11 and attach a pump to inflate the tube 10 until it not only expands to a nearly circular cross-section and completely fills the tire, but until any desired air-pressure is secured, so that the tire is brought up to the same working condition as before the puncture, and is, in fact, in even better condition, since it is now provided with a two-ply lining which is even more leak-proof than the original tire. During the inflation of the tube 10 it will be understood that the cap 6 belonging to valve 5 may be removed and the back check-valve therein released by the usual means to enable any residuum of air to escape from between the tubes 10 and 4, all of such air eventually escaping through either the valve 5 or the puncture. When the tire, the lining 4, and the tube 10 all become punctured, the tire may be again reinflated by means of the valve 16 and the tube 13, and when the latter becomes punctured the tire may be still again inflated by means of the valve 18 and tube 14, so that except in unusual cases the tire may be depended upon to hold the air until the tread is worn through. Moreover, as each spare tube is brought into use the tire becomes still more leak-proof.

Referring to Fig. 4, it will be seen that a number of straight tubes—say four—may be inserted one within another, as at 4, 10, 13, and 14, with all their ends cut diagonally, so that the two ends of each tube may be brought together and a joint formed, the innermost tube being first joined, then the next outer tube, and so on. These tubes at Fig. 4 are in a partly-cured condition, so that they can be handled, and each is coated, preferably, with graphite, so as to prevent the tubes from adhering to one another in the subsequent vulcanization, and also so as to enable the tubes to slip freely one upon another when in use or when being expanded, so as to avoid liability of tearing or grinding the same. The nested valves (seen at Fig. 4) it will be understood may be attached to the tubes readily, the valve-hole in the outer tubes being the largest and permitting access to the inner tubes. The innermost valve-stem 17 may therefore be attached first to the tube 14, then the stem 15 to the tube 13, and so on, and, if desired, the nipples 19 may be attached to the stems after the latter are attached to the tubes. The cover 2 of the hose-pipe tire is added before the ends at Fig. 4 are joined, and after all the ends are joined the assemblage is put in a mold for vulcanization, so that the tube 4 is preferably vulcanized to the cover 2, while the remaining tubes remain separate from one another. In vulcanization steam may be admitted within the lining-tube 4, so as to expand the tire to fit the mold, and it may also be admitted within each of the other tubes, each of which is provided inside and out with a coating of graphite or the like, or the steam may be admitted only through tube 14, thereby expanding all the tubes and the tire during the vulcanization process.

Referring now to Fig. 2, it will be seen that the cover $2^a$ is open at $2^b$ along the entire rim side, so as to be detachable from the rim $1^a$, which may be of any variety. The outermost of the four double-ended air-tubes, which is designated as 4, is expanded within the cover, but is not vulcanized or attached thereto, and together with its contained spare tube 10, 13, and 14 may be removed from the tire any time and a fresh nest of tubes substituted. It will be seen that the valve-stems bear numerals "1," "2," "3," and "4," thereby indicating the order in which the valves are to be used, valve "1" being used exclusively of the others until the tire suffers a puncture, and then valve "2" until the tire is again punctured, then valve "3" until the next puncture, and finally valve "4."

Referring now to Fig. 3, it will be seen that the spare tubes (only two of which are shown) are not inclosed one within another, but lie against the rim side of the tire opposite to the tread portion thereof, the sides of said tubes overlapping. A valve is provided for the tube 4 and numbered "1," a separate valve numbered "2" being used for the spare tube designated as 21 and a separate valve numbered "3" for spare tube 22. At Fig. 3 the tire is represented as having been expanded by use of the valve "1." After the tire is punctured valve "2" is used and the tube 21 is blown up until it fills and distends the tire, the effect being the same as when tube 10 is expanded at Fig. 1. When the tire is again punctured, valve "3" is employed to expand tube 22, which fills the tire in the same manner as already explained with reference to tube 21. In order at this operation to permit said tube 21 to vent, the cap 6 may be removed from the valve "2" and the check-valve released in a well-known manner, whereby as the tube 22 expands the tube 21 is caused to collapse and finally to fold and pack against the wall of the tire.

Still other variations may be resorted to—as, for instance, in the manner seen at Fig. 5. As will be seen, it is unnecessary in this form for the rim sides of the spare tubes to be separate from one another or from the lining 4. Said tube 4 is represented as formed with festooned or loosely-hanging diaphragms 24 and 25, whereby the bore of the tire is divided into three tubes or compartments, (designated as A, B, and C.) The main compartment A is provided with a valve numbered "1," whereby the air may be forced into said compartment and the soft-rubber diaphragms 24 and 25 collapsed against the rim side of the tire. When the tire becomes punctured, the valve numbered "2" is used to fill tube or compartment B, and thereby reinflate the tire, whereby diaphragm 24 is caused to expand out against the wall of the tire and distend the same, the diaphragm 25 remaining in its collapsed condition. After another puncture is sustained the valve marked "3" is used to inflate tube or compartment C, expanding the diaphragm 25 in the manner already explained with reference to 24. It will be understood that when one valve is being used to expand the tire the other valves may be left open to permit the respective compartments to vent.

Portions of my improvements may be used without others.

Having thus described my invention, I claim—

1. A pneumatic tire comprising an outer tube or cover, a series of inner tubes nested one within the other, and a set of inflation-valves one for each of said inner tubes; said valves having stem portions nested one within another.

2. A pneumatic tire comprising an outer tube or cover, a series of inner tubes nested one within another, and a set of inflation-valves one for each of said inner tubes; said valves having stem portions nested one within another; the innermost valve-stem being connected to the innermost tube, the next outer stem to the next outer tube, and so on throughout the series.

3. A hose-pipe tire having vulcanized thereto an inner air-tight lining and containing a series of soft flexible rubber tubes nested one within another, with means for inflating said hose-pipe tire and said tubes one after another.

4. A pneumatic tire comprising a cover or outer tube provided with inflating means, a series of flexible inner tubes nested one within another and inflatable independently of one another and of said outer tube, and means for inflating one of the nested tubes when the air is exhausted from another thereof.

5. A pneumatic tire comprising a cover or outer tube provided with inflating means, a series of flexible inner tubes or compartments nested one within another, and means for inflating any of said inner tubes at will independently of the cover or the remaining inner tubes.

6. A pneumatic tire comprising a cover or outer tube, endless tubes within said outer tube and inflatable independently of one another, and means for inflating one after another said outer and inner tubes.

7. As a new article of manufacture, an inflatable outer tire-tube provided with a series of endless inner tubes inflatable independently of one another and of said outer tube.

8. In a tire, an endless inflatable air-tube, an endless air-tube within said tube and independently inflatable, and an endless air-tube within the last-mentioned tube and inflatable independently of either of said tubes.

9. In a tire, an endless inflatable air-tube, an endless inflatable air-tube within said tube, an endless inflatable air-tube within the last-mentioned tube, and a set of inflation-valves, one for each of said tubes.

10. A pneumatic tire comprising a cover or outer tube provided with inflating means, a series of endless inflatable inner tubes usable independently of one another, and means for inflating said inner tubes.

11. A pneumatic tire comprising a cover or outer tube provided with inflating means, an inflation-valve therefor, a plurality of endless inner tubes, and an inflation-valve for each of said inner tubes.

12. A pneumatic tire comprising a cover or outer tube, an inflation-valve therefor, a plurality of endless inner tubes, and means for inflating said inner tubes independently of one another and of said outer tube.

13. An inflatable pneumatic tire carrying a set of endless spare inner tubes each of which is inflatable independently of the other and of said tire.

14. In a pneumatic tire, the combination with an outer tube or cover having a tread portion, of a plurality of spare inflatable endless tubes within said outer tube and packed together opposite said tread portion, said outer tube being inflatable independently of said inner tubes.

15. A pneumatic tire comprising an outer inflatable tube or cover, a series of inner tubes nested one within the other, and a set of valves one for each of said cover and tubes; said valves having stem portions; the innermost valve-stem being connected to the innermost tube, the next outer stem to the next outer tube, and so on throughout the series; each of said stem portions being provided with an inflation-nipple having a detachable cap.

16. A pneumatic tire comprising an inflatable outer tube or cover, a series of inner tubes nested one within the other, and a set of inflation-valves one for each of said outer and inner tubes; said valves bearing serial numbers.

17. A "hose-pipe" tire provided with an inflation-valve and containing a plurality of endless spare inner tubes each also provided with an inflation-valve.

18. A "hose-pipe" tire provided with an inflation-valve, and containing a plurality of endless spare inner tubes inflatable independently of each other and of said tire.

19. A "hose-pipe" tire provided with an inflation-valve, and containing a plurality of spare inner tubes inflatable independently of each other and of said tire; said inner tubes being endless and nested or contained one within another.

20. A pneumatic tire comprising inflatable tubes nested one within another, and a set of valves one for each of said tubes, said valves having stems nested one within another and provided with separate inflation-nipples.

21. A pneumatic tire comprising inflatable tubes nested one within another, and valves nested one within another, the outer valve connected to the outer tube, and the inner valve connected to the inner tube.

22. A pneumatic tire comprising an inflatable tube and a valve therefor; an air-tube within said tube and provided with a valve within said valve; and an air-tube within the last-mentioned air-tube and provided with a valve within the last-mentioned valve.

FRANK A. MAGOWAN.

Witnesses:
B. C. STICKNEY,
KITTIE FRANKFORT.